UNITED STATES PATENT OFFICE.

WILLIAM BUDD, OF PHILADELPHIA, PENNSYLVANIA, ASSIGNOR TO LOOMIS G. MARSHALL AND ANDREW COCHRAN, OF SAME PLACE.

IMPROVED NON-FUSIBLE FUEL.

Specification forming part of Letters Patent No. 40,791, dated December 1, 1863.

*To all whom it may concern:*

Be it known that I, WM. BUDD, of the city of Philadelphia, State of Pennsylvania, have invented a new and Improved Mode of Making a Certain Non-Fusible Fuel; and I do hereby declare that the following is a full and exact description thereof.

The nature of my invention consists in the preparing of the clay, molasses, and water so as to develop their ultimate glutenous properties preparatory to mixing in the coal and adding thereto the petroleum, all of which forms the non-fusible fuel, the peculiar property of which is that combustion increases the individuality of each piece until the whole is consumed.

To enable others to make my non-fusible fuel, I will proceed to describe the manner of preparing the same.

I take, for instance, ten pounds of clay or loam and thoroughly dry it by exposure to the sun or by artificial heat. When so dried I slack the same with a fluid made of—say, for instance—two parts water and one part molasses, so as to form a complete solution of molasses, water, and clay. I then let the same stand covered for five or more days, so as to develop its ultimate glutenous properties, and when so prepared I add to the ten pounds of clay, as aforesaid, from one to four hundred pounds of coal-dust or fine coal, working the whole into a stiff compound. I then piece it and dry it for ordinary use.

For furnaces where great heat is required I in preparing the fuel work in the petroleum; or, after the fuel is made and dried, I soak it in petroleum. In either case, say, for instance, I use one gallon to the one hundred of the said fuel.

What I claim as my invention, and desire to secure to my assignees by Letters Patent, is—

1. The combination of the several materials, as hereinbefore set forth, with or without the proportions and manipulation, so as to make a non-fusible fuel.

2. The use of molasses in any other compound for fuel.

In witness whereof I have hereunto set my hand and seal.

WILLIAM BUDD. [L. S.]

Witnesses:
J. L. HUSBAND,
WM. I. BROWN.